Aug. 5, 1969 SADAO TAKUBO 3,459,085
MACHINE FOR MANUFACTURING LENS MOLDS FOR EYEGLASSES
Filed Nov. 16, 1966 3 Sheets-Sheet 1

INVENTOR
Sadao Takubo

BY
Holcombe, Witherill & Brisebois
ATTORNEYS

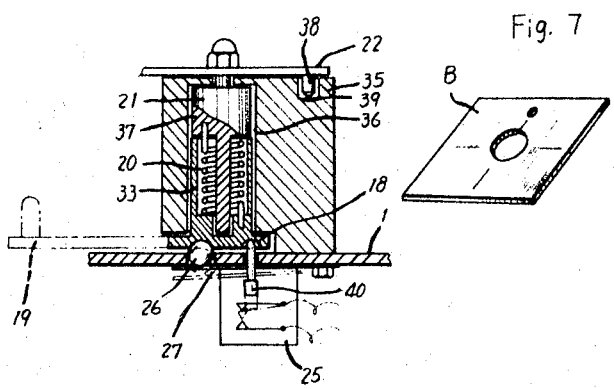
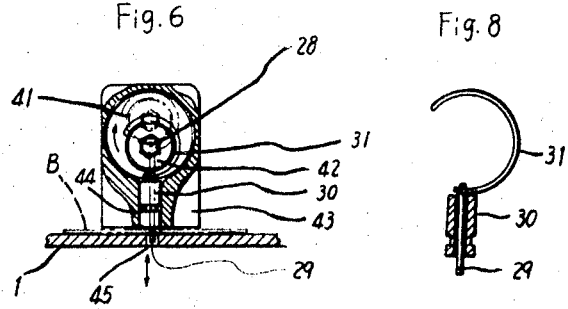

United States Patent Office 3,459,085
Patented Aug. 5, 1969

3,459,085
MACHINE FOR MANUFACTURING LENS
MOLDS FOR EYEGLASSES
Sadao Takubo, 4155-4 Tadanoumi-cho, Takehara,
Hiroshima Prefecture, Japan
Filed Nov. 16, 1966, Ser. No. 594,877
Claims priority, application Japan, Jan. 27, 1966,
41/4,854
Int. Cl. B26d 7/06; B43l 13/00
U.S. Cl. 83—410     2 Claims

ABSTRACT OF THE DISCLOSURE

A machine for manufacturing molds for eyeglass lenses comprising two separate rotatable mounts for holding an eyeglass frame on one and a mold blank on the other for synchronous rotation with each other, a follower urged against an edge of the eyeglass frame, and a cutting head for cutting the mold blank to conform to a contour of the eyeglass frame in a single rotation of the rotatable mounts.

---

This invention relates to an automatic drive for manufacturing the molds in which lens blanks for eyeglasses are cast. Recently, the number of people wearing spectacles has been increasing and the variety of spectacle frames is expanding with that increase.

The shaping of lens blanks requires a mold. One mold will suffice for producing any number of lens blanks of a single type. But when the shape differs from one frame to another, a corresponding eyeglass mold is required for each frame shape. The present invention offers a device which can meet this demand.

Conventionally, lens blanks are shaped with a matching mold by the lens grinder. Though ideal, this method is troublesome, because every mold must be prepared manually and therein lies the problem which has been waiting for solution. This invention aims at a simplified means for manufacturing the mold.

A preferred embodiment of this invention will now be described with reference to the attached drawings, in which:

FIG. 5 is a partial vertical section taken along the line V—V of FIG. 1, in the direction indicated by the arrow, showing the axis on which said copying arm turns;

FIG. 6 is a partial vertical section taken through the part encircling the cutting head, along the line VI—VI of FIG. 1, in the direction indicated by the arrow;

FIG. 7 shows a mold blank before it has been cut; and

FIG. 8 shows the cutting head and a vertical section through its supporting cylinder.

Figure 1:
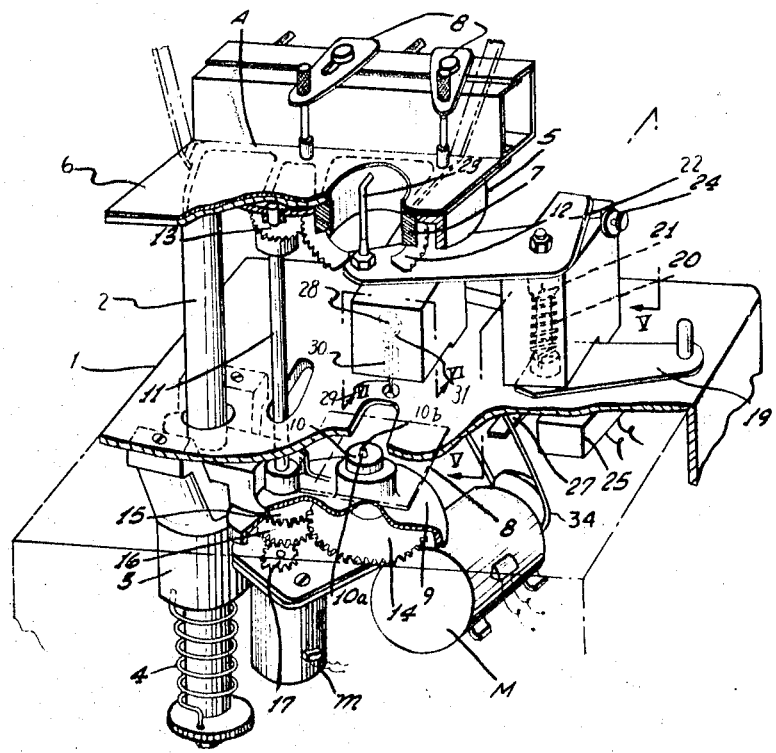
FIG. 1 is a perspective view showing a device according to this invention, partially cut away to show certain component parts more clearly.

The vertical shaft 2 shown near the center on the left side of the casing 1 is rotatably mounted in the bearings 3 within the casing 1. The lower end of the shaft 2 passes through the bearings 3 and is encircled by the return spring 4, one end of which is fixed to said shaft while its other end is fixed to the bearing 3. The horizontally oscillating arm 5 is fixed to the top of the shaft 2 and carries rotatably a hollow cylinder 7 which, journalled therein, carries a spectacle frame supporting stand 6 which is fixed thereto. The said spectacle frame supporting stand 6 is equipped with metal clamps 8, 8', for holding a spectacle frame A shown in phantom lines.

A lower horizontally oscillating arm 9 is mounted near the bearing 3 of the shaft 2. In this oscillating arm 9 is journalled a stem 10 which is equipped with a projection 10a surmounted by a minor projection 10b for mounting the mold blank B. A gear 14 is fixed to the stem 10. The cylinder 7 is encircled by an externally toothed ring gear 12, which is driven by the drive shaft 11 through the gear 13 to rotate between the upper oscillating arm 5 and the lower oscillating arm 9. The drive shaft 11 carries at its lower end the gear 15 meshing with the gear 14 fixed to the stem 10 and the gear 16 fixed to the shaft of a low-speed motor $m$.

As seen from FIG. 5, a cylindrical shaft 33 is fixed to the lever 19. A shaft 21, comprising a section 37 of larger circumference, extends into the hollow shaft 33, with the narrow end of the shaft 21 inserted into the hollow shaft 33. Both the solid shaft 21 and the hollow shaft 33 are mounted in a cylindrical recess 36 in the support 35. One end of a helical spring 20 encircling the shaft 21 is anchored thereto, while its other end is fixed to the hollow shaft 33. The helical spring 20 should be stiffer than the return spring 4.

Figure 3:
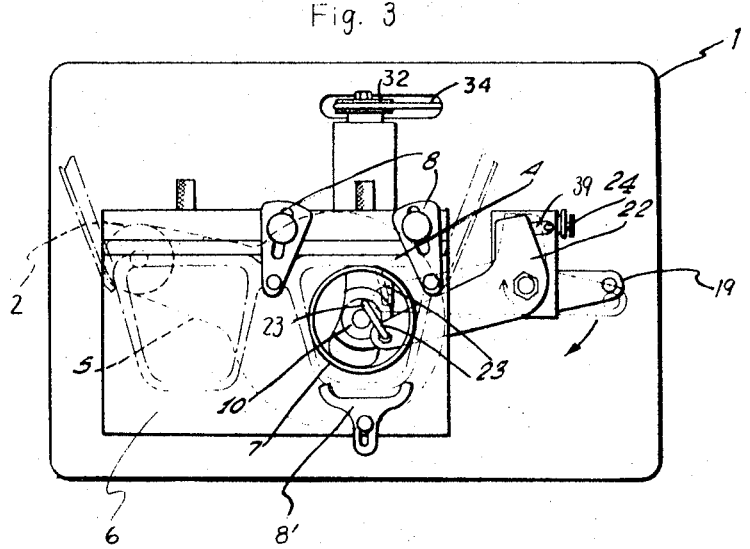
FIGS. 3 and 4 are plan views of said device showing the copying arm in different positions relative to the spectacle frame.
Figure 4:
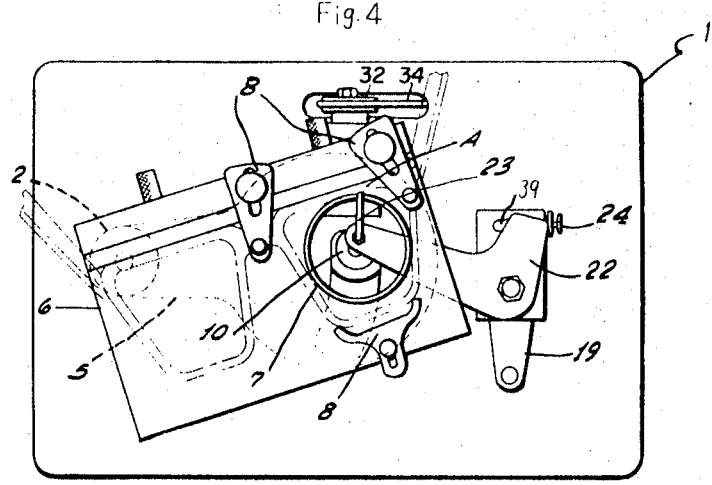

The lever 19, and the hollow cylinder 33 to which said lever is attached, are supported on the steel ball 26, supported by the leaf spring 27. A cammed surface 18 near the inner end of the lever 19 contacts the operating rod 40 controlling the microswitch 25 so that the operating rod 40 may be lowered when said lever is rotated. At the upper end of the shaft 21 is a copying arm 22 carrying a follower 23. From the rear end of said arm 22 depends a projection 38, which fits into the arcuate groove 39 on the support 35. This groove 39 serves to restrict the range of movement of the copying arm 22. As seen in FIGS. 3 and 4, an adjusting screw 24 is provided at one end of the groove 39 to regulate the clockwise motion of the copying arm.

The shaft 41 (FIG. 6), belt driven by the main motor M, carries an eccentric rod 28, which in turn carries a disk 42. A notched ring 31 loosely encircles the disk 42 and carries the cutting head 29, said head 29 passing through the supporting cylinder 30 in the hole 44 in the bearing 43 in alignment with the small hole 45 in the casing 1. Rotation of the shaft 41 thus vertically reciprocates the cutting head 29.

Figure 2:
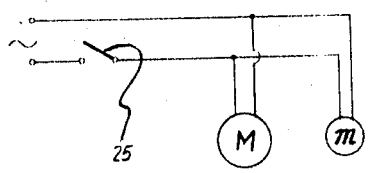
FIG. 2 shows the circuit diagram of said device.

In operation, when a spectacle frame A is set on the spectacle frame-mounting stand 6 and the copying lever 19 is turned in the direction indicated by the arrow in FIG. 3, the operating rod 40 of the microswitch 25 will be pressed down by the cammed surface 18 of said lever 19 and both the low-speed motor $m$ and the main motor M will be simultaneously started by the simplified circuit shown in FIG. 2 and controlled by switch 25. Meanwhile, the turning of the lever 19 acting through the hollow cylinder 33, spring 20 and shaft 21, will cause clockwise rotation of the copying arm 22, so that the follower 23 on the copying arm moves forward into contact with the inside of the frame A, overcoming the force of the return spring 4 until it is held stationary at the position shown in FIG. 4, directly above the cutting head 29. In FIGURES 1, 3 and 4, 32 is pulley mounted to the shaft 41 and 34 is belt provided between the said pulley 32 and the pulley of motor M.

The return spring 4 acts on the spectacle frame A, utilizing the vertical shaft 2 as a fulcrum, with a force in a direction opposite to that in which the pressure of the follower 23 is being applied. And the low-speed motor $m$ drives both the mold-attached shaft 10 (through the gears 17, 16, 15, 14), and the spectacle frame-mounting stand 6 (through the drive shaft 11 and the gears 13, 12) at low speed. As a result, the mold blank B attached to the shaft 10 and the spectacle frame A attached to the said stand 6 turn and oscillate in synchronism.

Thus, the mold blank passing under the cutting head 29 is cut by said head to conform to the contour of the spectacle frame A and in a single rotation of the spectacle frame-mounting stand 6, said blank will be finished into a mold having the same shape and size as the inside of one lens hole in said frame A.

In accordance with the process described above, the device according to this invention can produce an individual mold of a particular shape or a plurality of such molds easily, rapidly and exactly.

It goes without saying that the present invention can be modified as to detail without thereby departing from the basic principles of the invention as defined by the following claims.

What is claimed is:

1. A machine for manufacturing molds for eyeglass lenses, said machine comprising rotatably mounted frame mounting means, said machine comprising rotatably mounted frame mounting means, a follower, resilient means for urging said follower against an edge of a frame held in said frame mounting means, a cutting head, mounting means in which said cutting head is mounted for reciprocating motion, rotatable mounting means for holding a mold blank to be cut by said cutting head, means for rotating said frame mounting means and said mold blank mounting means in synchronism with each other, and biassing means resisting said resilient means by opposing the pressure exerted by said follower against said frame mounting means with a weaker force.

2. A machine for manufacturing molds for eyeglass lenses, said machine comprising a first arm mounted for oscillating motion, a frame mounting means rotatably mounted in said first arm, a follower, resilient means for urging said follower against an edge of a frame held in said frame mounting means, a cutting head, mounting means in which said cutting head is mounted for reciprocating motion, a second arm mounted for oscillating motion in synchronism with said first arm, a support for a mold blank to be cut by said cutting head rotatably mounted in said second arm, said first arm and said second arm being separated by a vertical distance from one another, and means for rotating said frame mounting means and said mold blank mounting means in synchronism with each other.

References Cited

UNITED STATES PATENTS

| | | | |
|---|---|---|---|
| 951,886 | 3/1910 | Preston | 83—410 |
| 2,177,087 | 10/1939 | Akerlind | 83—410 |
| 2,582,117 | 1/1952 | Guillermet et al. | 33—28 X |
| 2,878,567 | 3/1959 | Hofman et al. | 33—28 |

FRANK T. YOST, Primary Examiner

U.S. Cl. X.R.

33—28; 83—413, 926